United States Patent [19]
Weiss et al.

[11] Patent Number: 5,862,901
[45] Date of Patent: Jan. 26, 1999

[54] FRICTION CLUTCH THAT PRODUCES PRESSURE FORCE WITH TWO SPRINGS

[75] Inventors: Michael Weiss, Dittelbrunn; Reinhold Weidinger, Unterspiesheim, both of Germany

[73] Assignee: Fichtel & Sachs AG, Schweinfurt, Germany

[21] Appl. No.: 806,694

[22] Filed: Feb. 26, 1997

[30] Foreign Application Priority Data

Mar. 7, 1996 [DE] Germany ............. 196 08 772.4

[51] Int. Cl.[6] .................. F16D 13/71; F16D 13/75
[52] U.S. Cl. ................... 192/70.25; 192/70.27; 192/111 A; 192/89.23
[58] Field of Search ............ 192/70.25, 70.27, 192/89.22, 89.23, 111 A

[56] References Cited

U.S. PATENT DOCUMENTS

| | | | |
|---|---|---|---|
| 5,400,887 | 3/1995 | Mizukami et al. | 192/89.23 |
| 5,409,091 | 4/1995 | Reik et al. | 192/70.25 |
| 5,551,547 | 9/1996 | Mizukami et al. | 192/89.23 |
| 5,579,881 | 12/1996 | Weidinger | 192/70.25 |
| 5,632,365 | 5/1997 | Maucher | 192/70.25 |
| 5,715,920 | 2/1998 | Lindner et al. | 192/70.25 |
| 5,715,921 | 2/1998 | Link et al. | 192/70.25 |

FOREIGN PATENT DOCUMENTS

| | | |
|---|---|---|
| 2 547 001 | 12/1984 | France . |
| 4326501 | 2/1994 | Germany . |
| 4436111 | 1/1996 | Germany . |
| 2 280 001 | 1/1995 | United Kingdom . |
| WO 96/00857 | 1/1996 | WIPO . |

*Primary Examiner*—Richard M. Lorence
*Attorney, Agent, or Firm*—Cohen, Pontani, Lieberman & Pavane

[57] ABSTRACT

A friction clutch, wherein the pressure force is obtained from the interaction of two different types of spring. A plate spring, which is unable by itself to apply the pressure force for transmitting the torque, is used, and at least one additional spring, which produces a force effect in the same direction and the force of which is added to the force of the diaphragm spring, is also used.

15 Claims, 4 Drawing Sheets

FRICTION CLUTCH THAT PRODUCES PRESSURE FORCE WITH TWO SPRINGS

BACKGROUND OF THE INVENTION

1. Field of the Invention

The present invention relates to a friction clutch, especially for motor vehicles. Such a clutch includes a counterpressure plate, a clutch housing attached to the counterpressure plate, and a pressure plate that runs in rotation-proof fashion in the clutch housing and can be prestressed by the force of a diaphragm or plate spring in the direction of the counterpressure plate. A clutch disk with cushion friction covers is clampable between the pressure plate and the counterpressure plate and transmits a torque from the counterpressure plate/pressure plate to a gear shaft by means of friction clamping.

2. Description of the Prior Art

German Patent 44 36 111 teaches a friction clutch in which a plate spring applies the pressure force for clamping the clutch disk. A disengaging element is also provided and has a spring action directed counter to the force of the plate spring.

SUMMARY OF THE INVENTION

The object of the present invention is to provide a friction clutch with a plate spring or diaphragm spring, which can transmit an increased torque by means of an increased pressure force without overtaxing the material of the diaphragm spring or the plate spring.

Pursuant to this object, and others which will become apparent hereafter, one aspect of the present invention resides in a friction clutch comprising a counterpressure plate, a clutch housing attached to the counterpressure plate, and a pressure plate non-rotatable relative to the clutch housing. First spring means are provided for apply a portion of a pressure force needed for prestressing the pressure plate toward the counterpressure plate to transmit torque. A clutch disk having friction linings is arranged between the pressure plate and the counterpressure plate so as to transmit the torque. Second spring means are arranged to apply an additional portion of the pressure force for transmitting the torque. The second spring means is arranged to act parallel to and in a common direction with the first spring means.

Because support is lent to diaphra gm spring or the plate spring by at least one additional spring, which acts parallel to the former spring and in the same direction, it is possible to increase transmission capacity when the existing diaphragm spring has reached its material limits. It has been found that this solution is substantially simpler than an enlargement of the diaphragm spring, because often the diameter ratios do not allow a larger spring to be used and also because further strengthening of the material may be impossible, due to internal stresses. Of course, the additional spring can be composed of multiple individual springs.

The additional spring can be responsible for an additional portion of pressure force, which can be on same order of magnitude as the portion provided by the diaphragm/plate spring.

The respective force portions can be in the range between 60 to 40% and 80 to 20%, i.e., the diaphragm or plate spring will apply approximately 60 to 80% of the pressure force.

Advantageously, in the engaged state (EB), both springs have a spring characteristic that declines in the disengagement direction. This ensures that the force needed to lift the friction clutch can be kept at a low level. The higher pressure force that can be attained with a clutch of this type thus requires operation with a greater force to only a small extent.

In the end region of the disengagement path, the additional spring can have a prestress at least approaching zero. With this type of design, a low disengaging force can be realized in an especially simple manner.

However, it is also possible for the additional spring to have a zero passage in the end region of the disengagement path. With such adjustment, the disengaging force can be further lowered; however, care must be taken that after the zero passage the additional spring does not tip into its other stable position, but rather is prevented from tipping.

Additionally, a suitable coupling is provided to prevent the additional spring from snapping after the zero passage. For example, this can be done by the arrangement of simple stops.

Advantageously, the additional spring is designed as a diaphragm or plate spring. Using such a spring, it is possible to easily produce a spring characteristic that declines as the disengagement path increases.

To facilitate adjustment of the two springs and to permit the same pressure force to be applied at all times, in another embodiment of the invention, a device is provided that compensates for the wear that occurs on the friction covers. In this way the installation position at least of the diaphragm or plate spring relative to the pressure plate or the clutch housing is kept substantially constant.

According to the invention, the additional spring is preferably supported on one side by the clutch housing and on the other side by the diaphragm spring. This permits a simple and space-saving arrangement of the additional spring.

In another embodiment, the diaphragm spring is supported on the clutch housing via holding elements. The additional spring is supported in the region of the holding elements on one side and, on the other side, at a radial distance from the elements, directly on the diaphragm spring. In this configuration, the holding elements for the diaphragm spring also serve to support the additional spring. As a result, the number of components of the friction clutch can be kept within certain limits. On the other hand, the additional spring is supported directly on the diaphragm spring at a radial distance from the holding elements, without the need for complicated transmitting elements.

In still another embodiment of the invention, the diaphragm spring is supported at a mean diameter by spacing bolts on the clutch housing. The diaphragm spring acts upon the pressure plate with a larger diameter and with the interconnection of elements of a device to compensate for the cover wear that occurs. In the region acting upon the diaphragm spring, the additional spring is axially connected to the diaphragm spring in a positive-locking fashion. This design ensures that the diaphragm spring always maintains its relative position, even when there is wear on the friction covers of the friction disk, and thus that the pressure force produced by the diaphragm spring can be kept constant over the useful life of the friction clutch. Furthermore, the additional spring, because it is supported on the holding elements and on the diaphragm spring, also maintains its relative position, and the additional pressure force produced by the additional spring remains constant as well. A positive-locking connection between the diaphragm spring and the additional spring makes it possible to allow the spring characteristic of the additional spring to pass through the zero point, so that a very favorable force curve for the operating system is obtained as the result of the sharply declining spring characteristic of the additional spring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
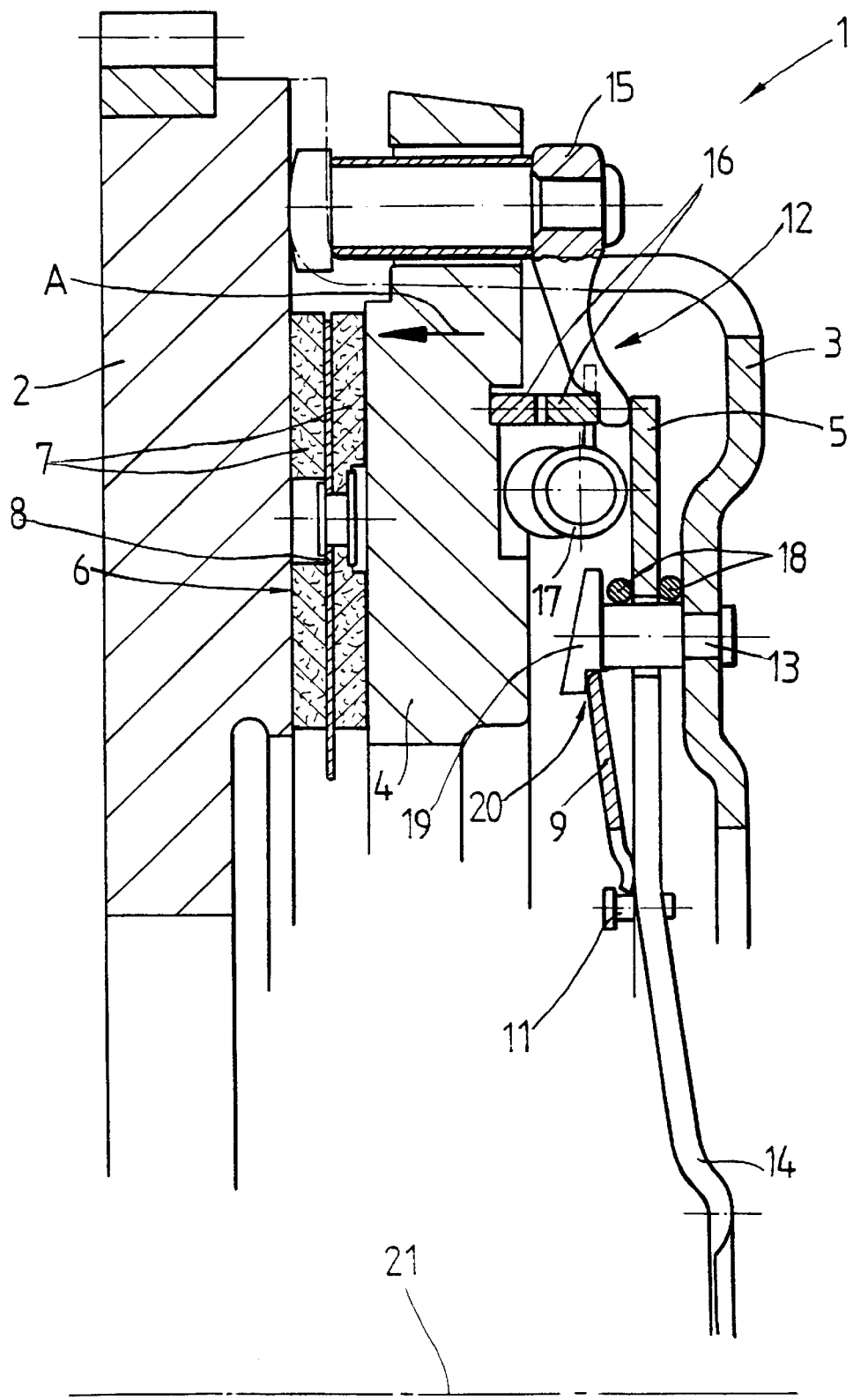
FIG. 1 shows the upper half of a longitudinal section through a friction clutch, pursuant to the present invention.

As shown in FIG. 1, the friction clutch 1 consists of a pressure plate, which is attached to a counterpressure plate 2 in the form of a flywheel of an internal combustion engine. The clutch housing 3 is attached to the counterpressure plate 2. The clutch housing 3 contains a pressure plate 4, which is arranged in rotation-proof but axially movable fashion relative to the clutch housing 3. A clutch disk 6 with friction facings 7 is clamped between the pressure plate 4 and the counterpressure plate 2 in order to transmit a torque to a gear shaft (not shown). The friction facings 7 are preferably equipped with cover springs 8, which apply an axial spring force. All parts of the friction clutch 1 are arranged concentric to and rotatable around the rotational axis 21.

To produce a pressure force on the pressure plate 4 in keeping with arrow A, a diaphragm spring 5 is mounted pivotally on the clutch housing 3 and acts upon the pressure plate 4. Between the diaphragm spring 5 and the pressure plate 4, a device 12 is provided to compensate for wear that occurs on the friction facings 7. Among other components, this device 12 has two adjustment rings 16, which are acted upon in the circumferential direction by a spring 17 and which, in keeping with the wear on the friction covers 7, upon reciprocal relative turning, increase the distance between the spring 5 and the pressure plate 4 by the extent of the wear. The device 12 also has at least one clearance-providing member 15, which can be moved axially in the pressure plate 4 counter to a clamping force and which, when wear occurs, is moved relative to the pressure plate 4 away from the counterpressure plate 2 in keeping with the wear and constitutes an adjustment limit for the adjustment rings 16.

In the illustrated embodiment, the diaphragm spring 5 is mounted pivotally at a mean diameter by means of multiple spacing bolts 13 distributed around the circumference on the clutch housing 3. In the region of its outer diameter, the diaphragm spring 5 acts on the pressure plate 4 via the adjustment rings 16. In the radially inward direction, the diaphragm spring 5 is equipped with multiple flexible tongues 14. which can be activated by a disengagement system (not shown). Two wire rings 18 are provided between the heads 19 of the spacing bolts 13 and the clutch housing 3. The rings 18 permit the tipping movement of the diaphragm spring 5 without greater losses.

Figure 4:
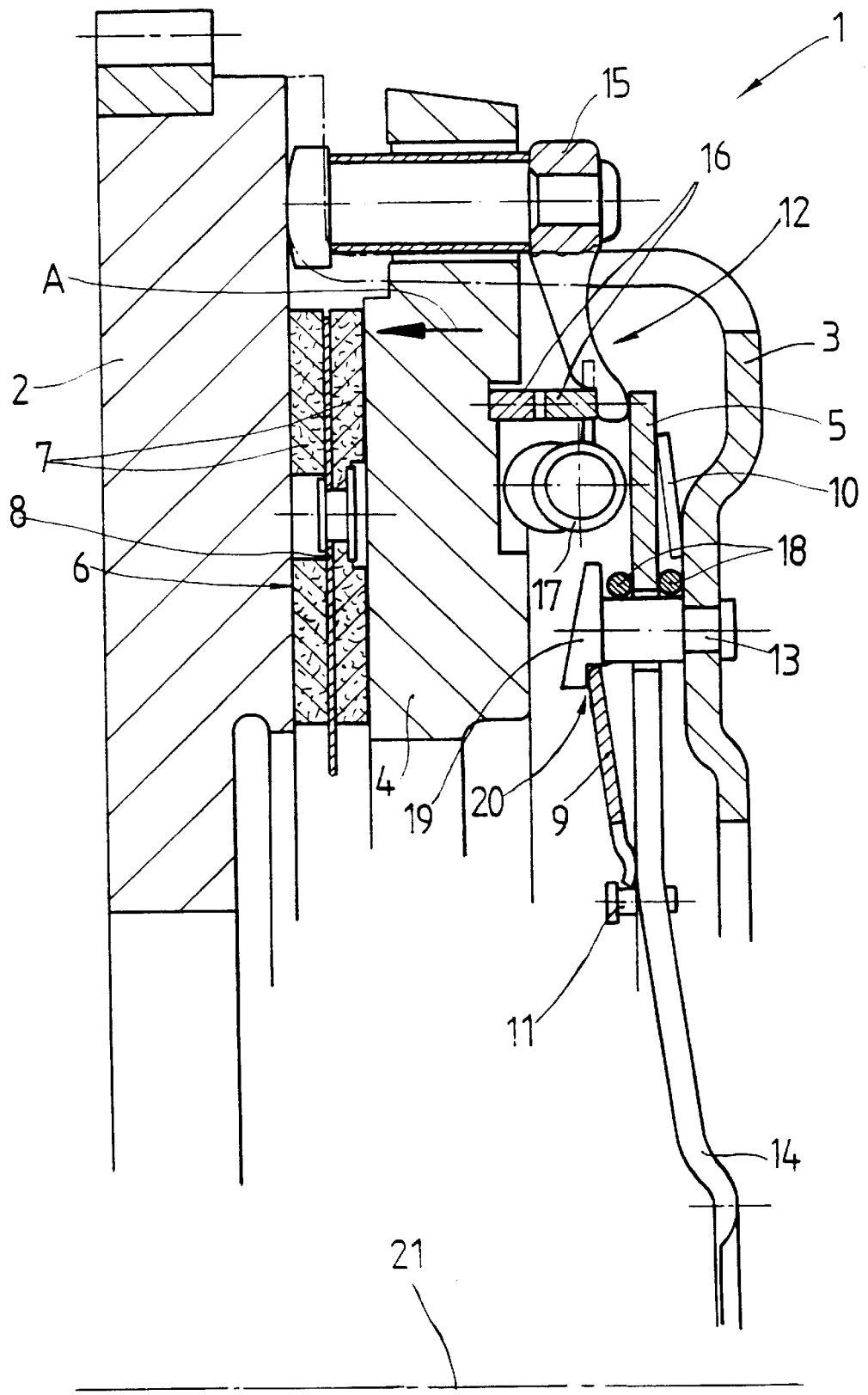
FIG. 4 is a view similar to FIG. 1, of a further embodiment.

An additional spring 9, 10 is provided, which is supported on one side on the clutch housing 3 and on the other side on the diaphragm spring 5. In the engaged state of the diaphragm spring 5, the additional spring 9, 10 is arranged so that its prestress force acts on the pressure plate 4 together with the prestress force of the diaphragm spring 5, so as to increase the prestress force in keeping with arrow A. In this arrangement of the spring 9, the spring 9 is supported in the region of its outer diameter on projections 20 of the spacing bolts 13 and is supported in its inner diameter region directly on the spring tongues 14 of the diaphragm spring 5. However, it is also possible to arrange the additional spring in the form of the spring 10, specifically, that is, in the diameter region radially outside of the spacing bolts 13, as shown in FIG. 4. In the region of its outer diameter, the spring 10 is arranged to rest on the diaphragm spring 5. In the region of its inner diameter, the spring 10 rests on the inside of the clutch housing 3. Here, too, the prestress of the spring 10 is directed so as to support the clamping force of the diaphragm spring 5. Given a certain layout of the springs 9, 10, care must be taken—for example, in the disengaged state of the friction clutch 1—that the spring cannot snap into its second rest position. For this purpose, when the spring 9 is used, multiple rivets 11 are distributed on the inner circumference, which are attached to corresponding spring tongues 14.

Figure 2:
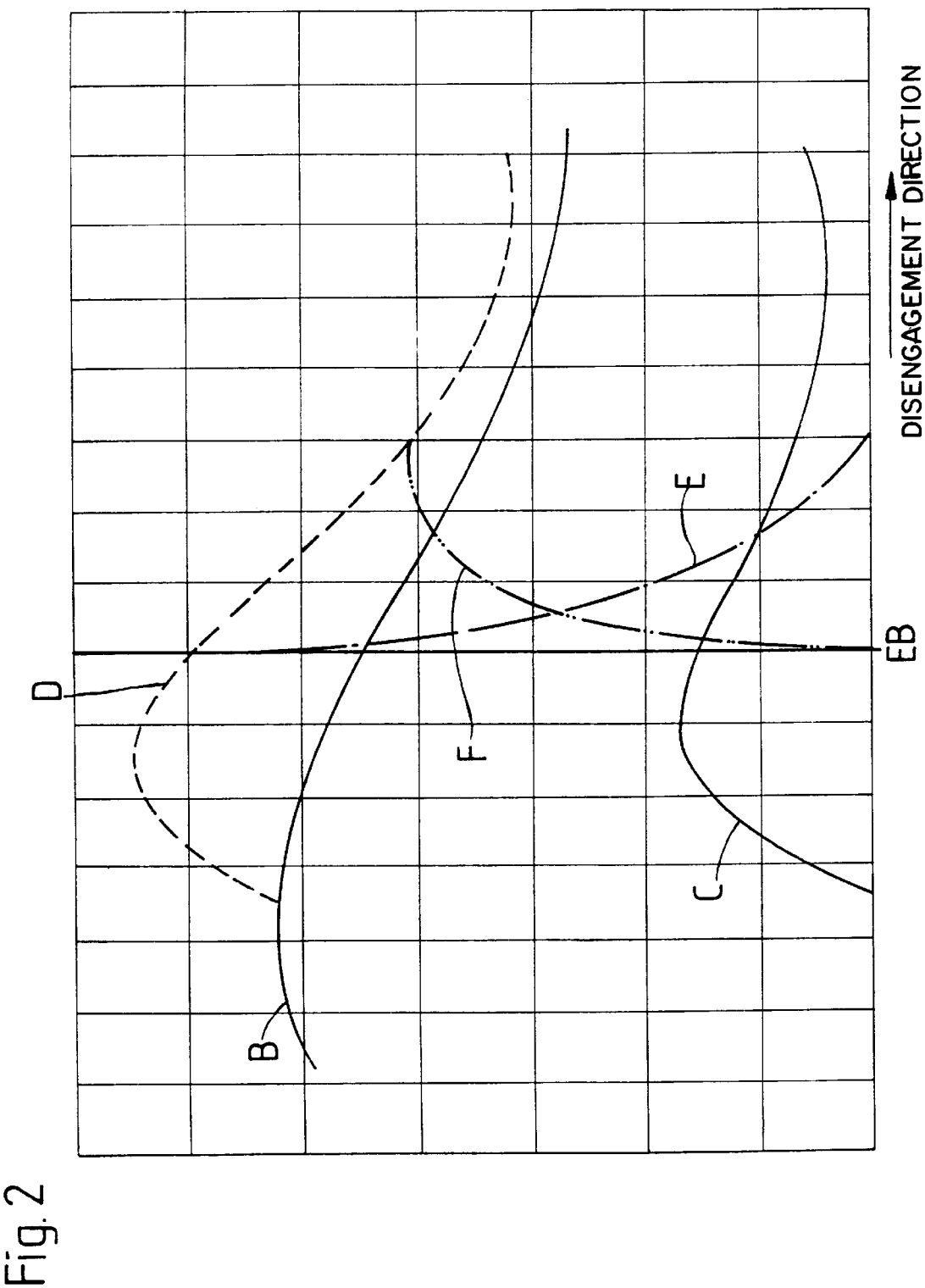
FIGS. 2 & 3 are spring force curves, with differently adjusted additional springs.
Figure 3:
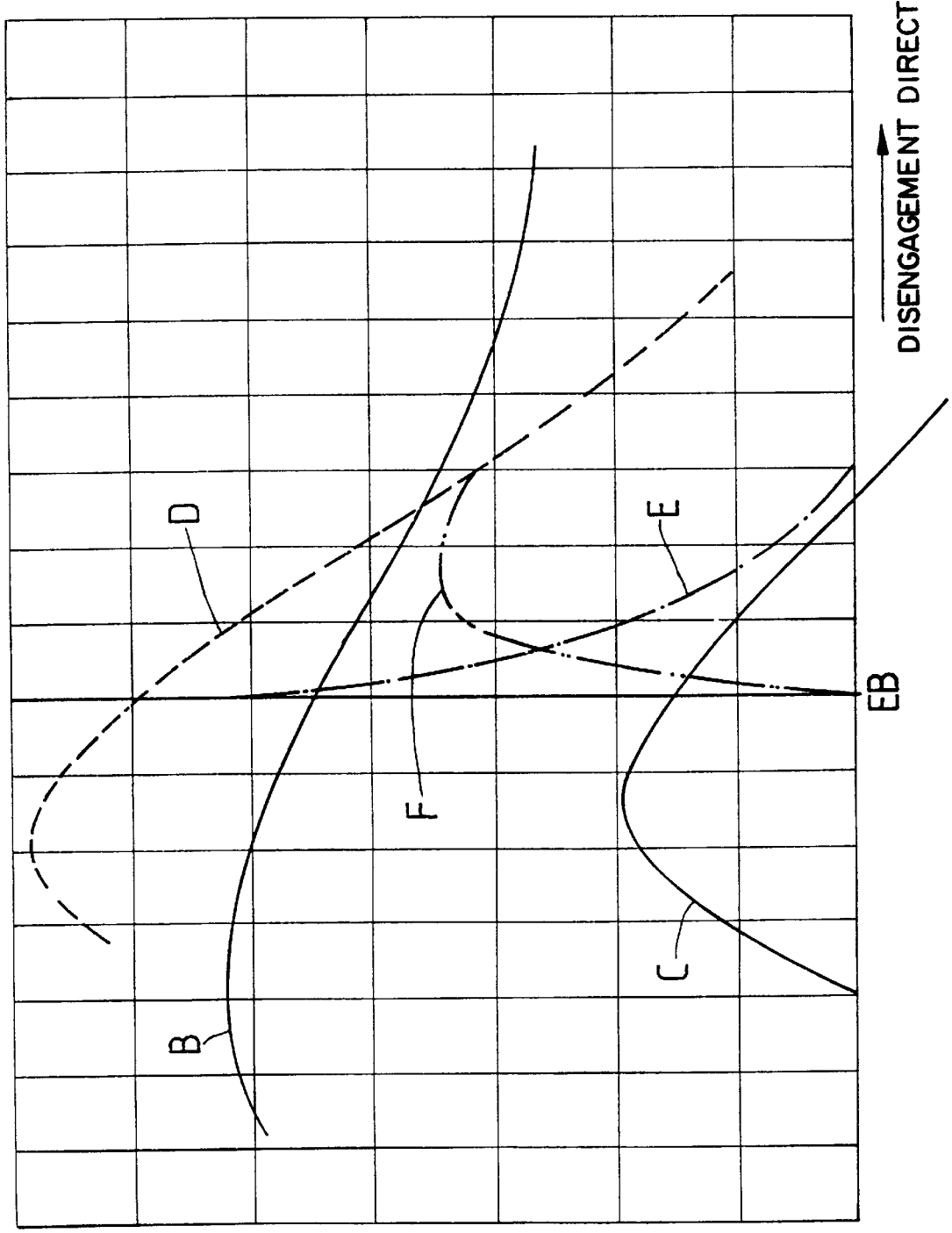

The function of the friction clutch 1 is explained in greater detail in conjunction with the treatment of FIGS. 2 and 3.

FIG. 2 shows spring force curves along the disengagement path. The installation position of the springs in the engaged state of the friction clutch 1 is indicated by EB. The spring characteristics or the spring force curves are marked as follows: The spring force curve B is that of the diaphragm or plate spring 5. The spring force curve C is that of the additional spring 9, 10. The spring force curve D is the sum of B and C. It should be noted that the diaphragm spring 5 alone, with only its spring force, cannot apply the desired transmitting capacity of the friction clutch. Only in connection with the additional spring 9 is a clamping force that can transmit the desired torque achieved for the pressure plate 4, in keeping with arrow A. As a result, the diaphragm spring 5 can be designed, in respect to its material properties, erring on the side of safety. Starting from the installation position, the spring characteristic of the additional spring 9 falls sharply along the disengagement path. As a result, the sum curve according to D has a sharply declining characteristic. This is advantageous in respect to low disengagement force. In addition, it should be pointed out that when cushioned friction covers are used with a characteristic E of the cover springs, a disengagement force curve F is attained. Because the spring forces of the cover springs 8 act, in keeping with the curve E, counter to the two springs 5 and 9 according to curve D, it is not necessary for the full force according to characteristic D to be applied by the disengagement system in the effective region of the cover spring means. This results in characteristic F, which reflects the disengagement force on the pressure plate 4. It should be noted that the disengagement force at the ends of the spring tongues 14 has the same curve, in principle, but is reduced to a clearly lower level in keeping with the lever ratios, i.e., the length of the flexible tongues relative to the radial extension of the diaphragm springs between their pivot support and their support on the pressure plate.

The spring force curves in FIG. 3 differ from those in FIG. 2 only in that the characteristic C of the additional springs 9, 10 is adjusted so that a zero passage occurs while still in the region of the disengagement path. This zero passage is explained by the fact that the additional spring 9, 10 in the form of a diaphragm or plate spring desires to snap out of its first stable position into its other stable position. As in FIG. 1, however, such snapping is prevented because the spring 9 is connected to the flexible tongues 14 in a positive-locking, for example, by rivets 11. By selecting such a curve, it is possible to clearly reduce the disengagement force needed, in keeping with curve F, compared to the design in FIG. 2. Nonetheless, it is ensured that a sufficiently great pressure force can be achieved at the installation point with the help of the additional spring 9, 10, in keeping with Arrow A.

The invention is not limited by the embodiments described above which are presented as examples only but can be modified in various ways within the scope of protection defined by the appended patent claims.

We claim:

1. A friction clutch, comprising: a counterpressure plate; a clutch housing attached to the counterpressure plate; a pressure plate non-rotatable relative to the clutch housing; first spring means for applying a portion of a pressure force for prestressing the pressure plate toward the counterpressure plate to transmit torque; a clutch disk with friction linings, the clutch disk being arranged to be clampable between the pressure plate and the counterpressure plate so as to transmit the torque; and second spring means arranged to apply an additional portion of the pressure force for transmitting the torque, the second spring means being arranged to act parallel to and in a common direction with the first spring means, the first spring means and the second spring means being configured to have, in an engaged state of the clutch, a spring characteristic that declines in a disengagement direction.

2. A friction clutch as defined in claim 1, wherein the first spring means is configured so as to apply at least half of the pressure force.

3. A friction clutch as defined in claim 2, wherein the first spring means are configured to apply the pressure force in a range of 60 to 40% and the second spring means are configured to apply the pressure force, complimentary to the first spring means, in a range of 40 to 60%.

4. A friction clutch as defined in claim 2, wherein the first spring means are configured to apply the pressure force in a range of 80 to 20% and the second spring means are configured to apply the pressure force, complimentary to the first spring means, in a range of 20 to 80%.

5. A friction clutch as in claim 1, wherein the second spring means is configured to have a prestress at least approaching zero in an end region of a disengagement path.

6. A friction clutch as defined in claim 5, wherein the second spring means is configured to have a zero passage in an end region of the disengagement path.

7. A friction clutch as defined in claim 6, and further comprising coupling means for preventing the second spring means from snapping after the zero passage.

8. A friction clutch as defined in claim 7, wherein the second spring means is a diaphragm spring.

9. A friction clutch as defined in claim 7, wherein the second spring means is a plate spring.

10. A friction clutch as defined in claim 1, and further comprising means for compensating for wear of the friction linings so as to maintain an installation position at least of the first spring means relative to one of the pressure plate and the clutch housing.

11. A friction clutch as defined in claim 8, wherein the second spring means has one side supported on the clutch housing and another side supported on the first spring means.

12. A friction clutch as defined in claim 11, and further comprising means for holding the first spring means on the clutch housing, the second spring means having one side supported in a region of the holding means and another side, at a radial distance from the holding means, directly on the first spring means.

13. A friction clutch as defined in claim 1, wherein the first spring means includes a diaphragm spring.

14. A friction clutch as defined in claim 1, wherein the first spring means includes a plate spring.

15. A friction clutch as defined in claim 12, wherein the holding means includes spacing bolts arranged on the clutch housing so as to support the diaphragm spring at a mean diameter, and further comprising means for compensating for friction lining wear, the diaphragm spring being arranged to act upon the pressure plate at a diameter larger than the mean diameter via the friction compensating means, the second spring means, in a region where the second spring means acts upon the diaphragm spring, being axially connected to the diaphragm spring in a positive-locking manner.

* * * * *